Feb. 12, 1935.  A. J. BOWIE  1,990,522
FLOWER PRESERVER
Filed June 29, 1932

Augustus Jesse Bowie
INVENTOR

Patented Feb. 12, 1935

1,990,522

UNITED STATES PATENT OFFICE 1,990,522

FLOWER PRESERVER

Augustus Jesse Bowie, San Francisco, Calif.

Application June 29, 1932, Serial No. 619,952

3 Claims. (Cl. 47—41)

This invention relates to improvements in the means of preservation of cut flowers. Its field of application is mainly in connection with the customary types of refrigerators. Experience has shown that cut flowers are much better preserved if they are not held in a vertical position. If the stems are placed in a water-filled receptacle, which is inclined to the horizontal, and a suitable support is provided for the heads of the flowers, not only does the water ascend the stems much more easily, but the stems are free from carrying the strain of their own weight and the weight of the flowers, and the support below the flowers relieves them of the strain imposed in an upright position which otherwise causes premature withering. By providing a water receptacle for the stems which is inclined to the horizontal, and a casing extended therefrom for supporting the heads of the flowers, the life of the flowers is greatly prolonged.

The most desirable results have been obtained by the use of an inclined, water-filled receptacle for the stems with, preferably, an enlarged receptacle for the heads of the flowers, which is practically horizontal, the stems bending to accommodate themselves to such a contour.

The space in refrigerators is usually very limited so that such a special receptacle is well adapted for these conditions. For proper preservation, the stems must be kept in water, and suitable protection must be afforded against injury of any kind and against drying out of the flowers. With the customary electric refrigerators, unless sufficient moisture is available, the water evaporates from the flowers, causing them to deteriorate. To take care of such conditions I provide a receptacle with, preferably, a relatively small cross section for the insertion of the stems, opening into an enlarged section for the heads of the flowers. The receptacle for the stems is, preferably, inclined to the horizontal, and the casing for the flowers is substantially horizontal. The casing is provided with a cover for enclosing the flowers after they are inserted, and they are thus protected from injury as well as from premature drying, the water in the stem receptacle supplying the necessary amount of moisture.

Figure 1:
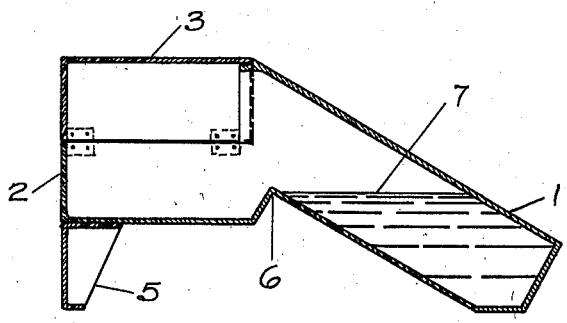
Figure 2:
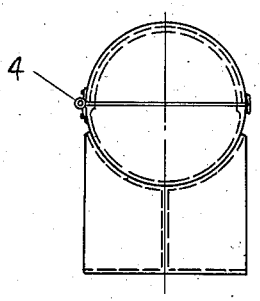
Figure 3:
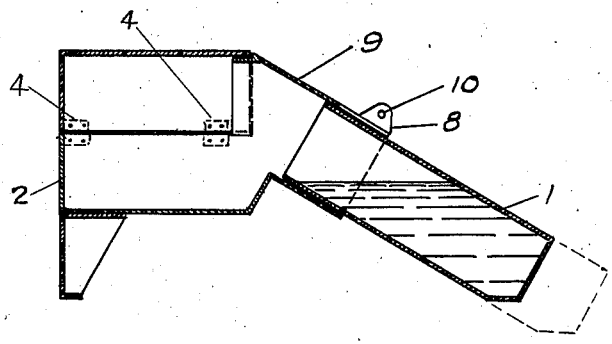
Figure 4:
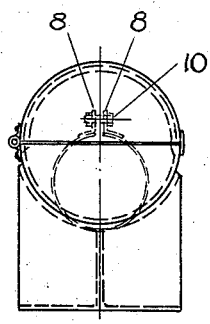
Figure 5:
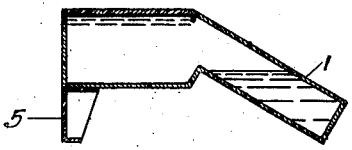

Figure 1 is a cross-sectional elevation of the preserver, and Figure 2 an end view thereof. Figure 3 shows a cross-section of another type of preserver, and Figure 4 shows the end view thereof. Figure 5 shows a cross-sectional elevation, and Figure 6 a cross-sectional end view of another type of preserver with a cover sliding over the top.

1 is the tubular receptacle for the stems, merging into an enlarged casing, 2, containing the flowers. 3 is a hinged cover pivoted on hinges 4, 4. 5 is a supporting leg adapted to mount the stem receptacle in a plane inclined to the horizontal. 6 is a throat piece in the upper end of the tube 1. This tube is filled with water up to the level 7, the throat, 6, preventing it from entering the casing, 2, wherein the flowers are placed. The hinged cover, 3, practically encloses the casing for the flowers.

Figure 6:
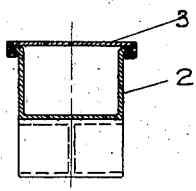

If desired, the type of construction shown in Figures 5 and 6 may be used. A convenient arrangement for refrigerators consists in suspending the cover, 3, from one of the shelves in the refrigerator, and sliding the container into place. In this event, the supporting leg, 5, can be dispensed with. This makes a very convenient arrangement since the part of the container beneath the flowers is available for placing other smaller articles on the shelf below.

Conventional containers call for flowers to have the stems immersed in water while the heads are in a straight line with the stems. This is quite impracticable in the space available in the usual refrigerator, so that my preserver, with the stems inclined to the horizontal, and an enlarged part for the flowers substantially horizontal, provides a very efficient and economical construction.

In order to accommodate different lengths of stems, Figures 3 and 4 show a telescoping arrangement whereby the water-tight tube which holds the stems of the flowers may be pushed in or out of the main body of the receptacle, thereby accommodating flowers with either longer or shorter stems. The dotted line in Figure 3 shows the lower end of the stem container when extended. 8, 8 are lugs on the neck-piece 9 which extends from casing 2 and surrounds the receptacle 1, which is inserted within the neck-piece 9 and may be clamped in any desired position by means of the clamp screw, 10, thus accommodating flowers of either longer or shorter stems, or adapting itself better to the available space in the refrigerator.

What I claim is:

1. A receptacle for flowers adapted to be placed in a refrigerator, comprising a tubular part adapted to retain the stems of the flowers, a casing extending therefrom adapted to receive the heads of the flowers, said tubular part being adapted to mount in a plane inclined to the horizontal and to serve as a retainer for water and for the stems.

2. A receptacle for flowers adapted to be placed in a refrigerator, comprising a tubular part adapted to retain the stems of the flows, an enlarged casing extending therefrom adapted to receive the heads of the flowers, said tubular part being adapted to mount in a plane inclined to the horizontal in order to serve as a retainer for water and for the stems, said casing being adapted to mount in a substantially horizontal position.

3. A receptacle for flowers, comprising a tubular part adapted to retain the stems of the flowers, an enlarged casing extending therefrom adapted to receive the heads of the flowers, said tubular part being adapted to mount in a plane inclined to the horizontal and to serve as a retainer for water and for the stems, enclosing means for enclosing said casing after said flowers are inserted, said receptacle being adapted to be inserted in a refrigerator, water for filling the tubular part, said water being adapted to supply the moisture for the stems and to provide the necessary moisture for the flowers to prevent drying.

AUGUSTUS JESSE BOWIE.